(12) United States Patent
Ramasubramanian et al.

(10) Patent No.: US 7,536,477 B2
(45) Date of Patent: May 19, 2009

(54) ACCESS MECHANISMS FOR EFFICIENT SHARING IN A NETWORK

(75) Inventors: Srinivasan Ramasubramanian, Tucson, AZ (US); Arun K. Somani, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 756 days.

(21) Appl. No.: 10/784,568

(22) Filed: Feb. 23, 2004

(65) Prior Publication Data
US 2004/0221052 A1 Nov. 4, 2004

Related U.S. Application Data

(60) Provisional application No. 60/450,258, filed on Feb. 25, 2003.

(51) Int. Cl.
*G06F 15/173* (2006.01)
(52) U.S. Cl. .................. 709/238; 455/517; 370/503; 370/224
(58) Field of Classification Search .............. 455/517; 370/503, 224; 709/238
See application file for complete search history.

(56) References Cited

U.S. PATENT DOCUMENTS

| 5,327,426 A | * | 7/1994 | Dolin et al. .......... 370/235 |
| 5,920,705 A | * | 7/1999 | Lyon et al. .......... 709/240 |
| 5,940,771 A | * | 8/1999 | Gollnick et al. ......... 455/517 |
| 5,966,380 A | * | 10/1999 | Przygienda .......... 370/389 |
| 5,982,747 A | * | 11/1999 | Ramfelt et al. .......... 370/224 |
| 6,070,194 A | * | 5/2000 | Yu et al. .......... 709/229 |
| 2003/0043855 A1 | * | 3/2003 | Yamamoto et al. .......... 370/503 |

OTHER PUBLICATIONS

Bux, "Local-Area Subnetworks: A Performance Comparison," *IEEE Transactions On Communications*, 1981, 29(10):1465-1473.
Cai et al., The Multitoken Interarrival Time (MTIT) Access Protocol For Supporting Variable Size Packets Over WDM Ring Network, *IEEE Journal on Selected Areas in Communications*, 2000, 18(10):2094-2104.
Cidon and Ofek, "MetaRing—A Full-Duplex Ring with Fairness and Spatial Reuse," *IEEE Transactions On Communications*, 1993, 41(1):110-120.

(Continued)

*Primary Examiner*—Don Wong
*Assistant Examiner*—Tuan-Khanh Phan
(74) *Attorney, Agent, or Firm*—Fish & Richardson P.C.

(57) ABSTRACT

One embodiment provides a computer-implemented method for processing data on a node. In this embodiment, the node first determines if a first transit buffer on the node is empty, wherein the first transit buffer is capable of holding one or more data packets destined for another node. If the first transit buffer is empty, the node transmits in a first direction a data packet stored in a first local buffer, wherein the first local buffer is capable of holding one or more data packets originating from the node. If, however, the first transit buffer is not empty, the node transmits in the first direction one or more data packets stored in the first transit buffer if a first transmission condition is satisfied. If the first transmission condition is not satisfied, the node transmits in the first direction a data packet stored in the first local buffer.

25 Claims, 8 Drawing Sheets

OTHER PUBLICATIONS

Cidon et al., "Improved Fairness Algorithms for Rings with Spatial Reuse," *IEEE/ACM Transactions on Networking*, 1997, 5(2):190-204.

Cohen and Segall, "Multiple Logical Token-Rings in a Single High-Speed Ring," *IEEE Transactions on Communications*, 1994, 42(2/3/4):1712-1721.

Imai et al., "ATMR: Ring Architecture for Broadband Networks", *Proceedings of the IEEE Globecom'90 Conference*, 1990, 1734-1738.

Kamal, "The multi-token ring network protocol", *Computer Networks and ISDN Systems*, 1994, 26(12):1477-1494.

King and Mitrani, "Modeling a Slotted Ring Local Area Network," *IEEE Transactions on Computers*, 1987, 36(5):554-561.

Loucks et al., "Short-Packet Transfer Performance in Local Area Ring Networks," *IEEE Transactions on Computers*, 1985, C-34(11):1006-1014.

Marsan et al., "An Almost Optimal MAC Protocol for All-Optical WDM Multi-Rings with Tunable Transmitters and Fixed Receivers," *IEEE International Conference on Communications*, 1997, Montreal, 1:437-442.

Shrikhande et al ., "HORNET: A Packet-Over-WDM Multiple Access Metropolitan Area Ring Network," *IEEE Journal on Selected Areas in Communications*, 2000, 18(10):2004-2016.

Srinivasan, "AMES-Ring: Access Mechanism for Efficient Sharing in Ring Networks," Public disclosure by inventors on Feb. 27, 2002, Slides presented to Cpr E 592 (IEEE), 6 pages.

"Proposed Draft Standard for Information Technology, Part 17: Resilient packet ring access method and physical layer Specifications," Jan. 29, 2002, 198 pages.

* cited by examiner

FIG. 1A

Variables Maintained At A Node

| No. | Variable | Description | Type | Value |
|---|---|---|---|---|
| 1 | ID | Node Identifier | Integer | 1-N |
| 2 | Direction | Identifier for the ring | Binary | UPSTREAM/DOWNSTREAM |
| 3 | LPR <Direction> | Last packet received from <Direction> | PACKET | |
| 4 | LPT <Direction> | Last packet transmitted in <Direction> | PACKET | |
| 5 | PMSN <Direction> | Permission to transmit in <Direction> | Binary | ENABLE/DISABLE |
| 6 | TR <Direction> | Transmission Round in <Direction> | Binary | ODD/EVEN |
| 7 | TBR <Direction> | Transit Buffer Round in <Direction> | Binary | ODD/EVEN |
| 8 | TBTH <Direction> | Transit Buffer Threshold in <Direction> | Integer | 0 Transit Buffer Size |
| 9 | NPQCR <Direction> | Number of packets queued in current TBR <Direction> | Integer | |
| 10 | NPTCR <Direction> | Number of packets transmitted in current TR <Direction> | Integer | |

Packet Fields (Excluding Payload)

| No. | Variable | Description | Type | Value |
|-----|----------|-------------|------|-------|
| 1 | Pkt.Src | Source Identifier | Integer | 1-N |
| 2 | Pkt.Dst | Destination Identifier | Integer | |
| 3 | Pkt.PMSN | Permission to transmit in the opposite direction | Binary | ENABLE/DISABLE |
| 4 | Pkt.Round | Transmission round of the packet | Binary | ODD/EVEN |

Changes To The Variables Maintained At The Node 100A

| Time | (Pkt.Dst, Pkt.Round) | (NPQCR, TBR) | Packet that is queued in Transit Buffer 104A or 104B | (LPR.Dst, LPR.Round) |
|---|---|---|---|---|
| 0 |  | (0, ODD) | — | ( — , — ) |
| 1 | (2, ODD) | (0, ODD) | — | (2, ODD) |
| 2 | (5, ODD) | (1, ODD) | (5, ODD) | (5, ODD) |
| 3 | (7, ODD) | (2, ODD) | (7, ODD) | (7, ODD) |
| 4 | (2, EVEN) | (0, EVEN) | — | (2, EVEN) |
| 5 | (2, EVEN) | (0, EVEN) | — | (2, EVEN) |
| 6 | — | (0, EVEN) | — | (2, EVEN) |
| 7 | (5, ODD) | (1, EVEN) | (5, EVEN) | (5, ODD) |
| 8 | (7, EVEN) | (1, ODD) | (7, ODD) | (7, EVEN) |

ACCESS MECHANISMS FOR EFFICIENT SHARING IN A NETWORK

RELATED APPLICATION

The present application claims the benefit of the filing date of U.S. Provisional Application No. 60/450,258, which was filed on Feb. 25, 2003.

STATEMENT REGARDING FEDERALLY SPONSORED RESEARCH

The work described herein was carried out, at least in part, using funds from National Science Foundation (NSF) Grant No. ANI-9973102. The government may, therefore, have certain rights in the invention.

TECHNICAL FIELD

This invention relates to data processing, and more particularly to access mechanisms for efficient sharing in a network.

BACKGROUND

Recent increases in network transmission speeds has necessitated the revision of local area network (LAN) and metropolitan area network (MAN) architectures and protocols. A MAN is a network that interconnects users with computer resources in a geographic area or region larger than that covered by even a large LAN but smaller than the area covered by a wide area network (WAN). One of the most popular architectures in MAN's is the bi-directional ring. The bi-directional ring is a simple architecture having two uni-directional, counter-rotating rings. The ring architecture provides fast and easy recovery from fiber-cut and node failures by wrapping the ring near the failed fiber or node. Other LAN and MAN architectures utilize different types of distributed network architectures.

Channel-access mechanisms for distributed networks, such as ring networks, have been studied extensively in the past. For example, in Token Ring networks, a bit- or token-passing scheme is used to prevent the collision of data between two network nodes that want to send messages at the same time. During operation, empty information packets are continuously circulated on the ring network. When a computer node in the ring has a message to send, it inserts a token set equal to 1 in an empty packet and inserts a message and a destination identifier in the packet. The packet is sent onward and then examined by each successive node in the network. When an intermediate node receives the packet, it routes the packet onward after determining that it is not the intended recipient of the message included within the packet. The intermediate note is not able, however, to add a new message of its own to the packet. When the recipient node receives the packet, it copies the message from the packet and changes the token back to 0. When the packet returns to the originating node, it sees that the token has been changed to 0 and removes the message from the packet.

Token Ring protocols have been shown to be effective in certain scenarios. However, as the transmission speed increases, the achievable throughput of the network may saturate at the peak transmission speed of a particular node in the network. In addition, channel-access mechanisms based on a single token, such as the Token Ring protocol, require complex mechanisms to account for lost or duplicate tokens. Multiple tokens can be employed to minimize delay at low loads and improve efficiency at high loads, but the access control scheme may become complex as transmissions from different nodes interfere with each other.

Other access mechanisms and protocols have also been used within distributed network architectures. For example, modern MAN's are predominantly based on the Synchronous Optical Network (SONET) architecture. SONET has been designed to operate in a circuit-switched manner by employing bandwidth sharing in the time domain. However, the share of the bandwidth allocated for a particular node may often be predetermined, which reduces the flexibility within the network architecture.

SUMMARY

Various embodiments of the invention are provided herein. One embodiment provides a computer-implemented method for processing data on a node having a node identifier. In this embodiment, the method includes receiving a first data packet on the node from a first direction, and checking a destination identifier of the first data packet. If the destination identifier of the first data packet does not match the node identifier, the method includes storing the first data packet in a first transit buffer. If the destination identifier of the first data packet matches the node identifier, the method includes processing the first data packet on the node to create a first processed packet, and storing the first processed data packet in a first local buffer. In some embodiments, the method further includes checking a transmission round of the first data packet, and if the transmission round of the first data packet does not match a transmission round of a previous data packet received on the node from the first direction, changing a first transit buffer round that is associated with the first transit buffer.

Various embodiments of the invention may have certain benefits and advantages. For example, fairness and efficiency with spatial reuse can be achieved in a distributed manner. Maximum throughput is capable of being achieved while ensuring a fair access to the bandwidth across the nodes in the network. In some embodiments, the network contains a number of nodes in a ring configuration. In one particular embodiment, these nodes are coupled in a daisy-chained fashion. In some embodiments, the network contains a number of nodes in a non-ring configuration. Extensibility of certain implementations provides for routing in arbitrary network topologies where nodes employ virtual output queuing.

The details of these and other embodiments of the invention are set forth in the accompanying attachments and descriptions. Other features, objects, and advantages of the invention will be apparent from the attachments and descriptions, and from the claims.

DETAILED DESCRIPTION

Figure 1A:
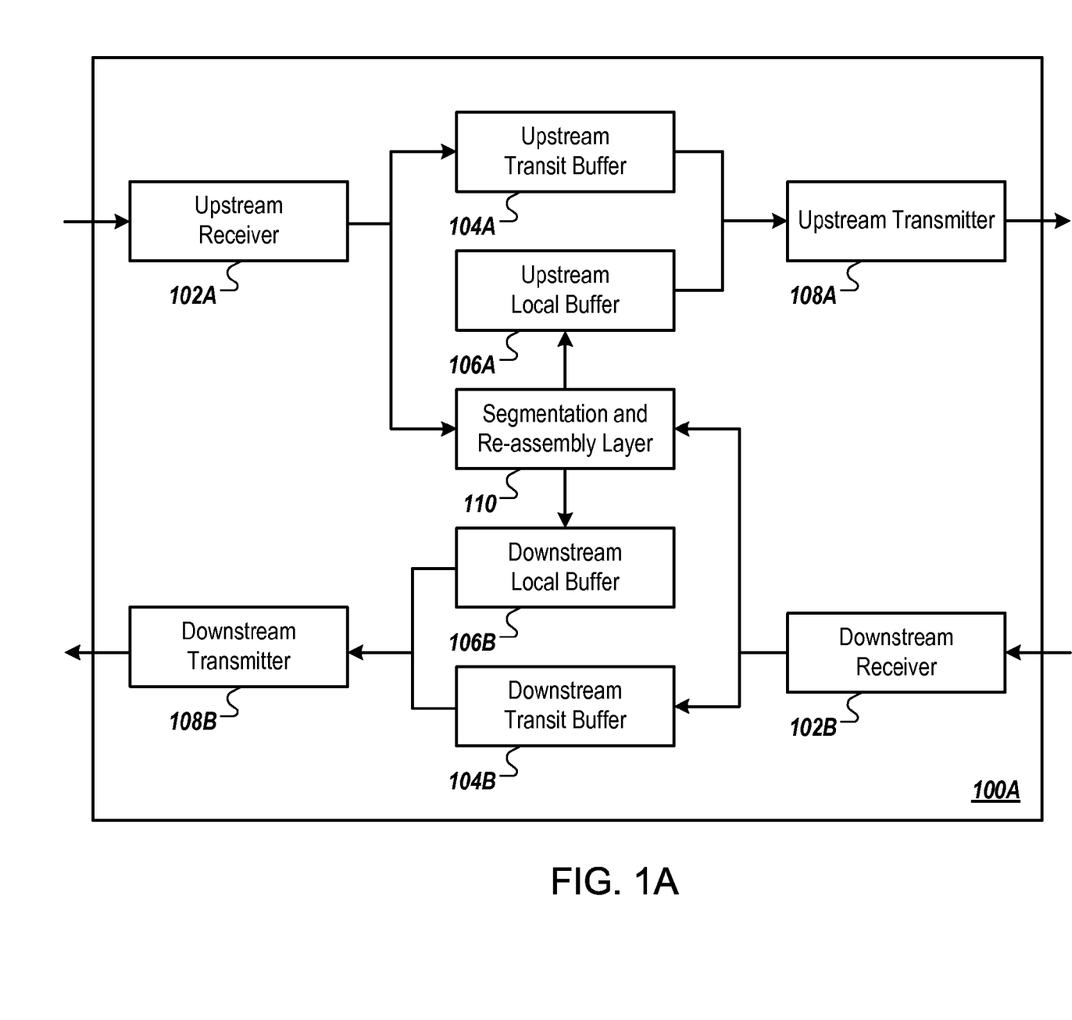
FIG. 1A is a block diagram of a node that is capable of processing data, according to one embodiment.

FIG. 1A is a block diagram of a node 100A that is capable of processing data, according to one embodiment. In this embodiment, the node 100A is part of a distributed network of nodes, such as the network 300 shown in FIG. 3 or the network 400 shown in FIG. 4. In these types of networks, fair bandwidth utilization can be achieved across different nodes, according to certain embodiments. In these embodiments, the minimum bandwidth received by any given node, such as the node 100A, can be maximized. Knowledge of connection information is may not be required, and spatial reuse of network bandwidth is achieved in a distributed manner as data is transmitted between neighboring nodes in the network.

The node 100A includes a set of receivers 102A and 102B, a set of transit buffers 104A and 104B, a set of local buffers 106A and 106B, a set of transmitters 108A and 108B, and a segmentation and reassembly (SAR) layer 110. The receiver 102A, the transit buffer 104A, the local buffer 106A, and the transmitter 108A are configured to process data in a first, or upstream, direction. The receiver 102B, the transit buffer 104B, the local buffer 106B, and the transmitter 108B are configured to process data in a second, or downstream, direction. During operation, the node 100A receives a first data packet on the receiver 102A from the upstream direction. The node 100A then checks a destination identifier that is included within the first data packet. If this destination identifier does not match a node identifier associated with the node 100A, then the node 100A will store the first data packet in the transit buffer 104A. If, however, the destination identifier of the first data packet does match the node identifier associated with the node 100A, then the node 100A will process the first data packet using the SAR layer 110 and store this processed data packet in the local buffer 106A. The SAR layer 110 is responsible for segmenting incoming data packets from the receiver 102A and reassembling them for later transmission using the transmitter 108A.

The node 100A is also configured to receive a second data packet on the receiver 102B from the downstream direction. Upon receipt of the second data packet, the node 100A checks a destination identifier that is contained within the second data packet. If this destination identifier does not match the node identifier of the node 100A, then the node 100A will store the second data packet in the transit buffer 104B. If, however, the destination identifier of the second data packet does match the node identifier of the node 100A, then the node 100A will process the second data packet using the SAR layer 110 and store this processed data packet in the local buffer 106B. The SAR layer 110 is responsible for segmenting incoming data packets from the receiver 102B and reassembling them for later transmission using the transmitter 108B. As shown in the example in FIG. 1A, the upstream direction is opposite to the downstream direction.

In one embodiment, the node 100A checks a transmission round of a data packet received by the receiver 102A. The transmission round is associated with the cycle in which the data packet is processed. If the transmission round does not match a transmission round of a previous data packet received by the receiver 102A, the node 100A changes a transit buffer round that is associated with the transit buffer 104A if one or more data packets are already stored in the transit buffer 104A. Further details of transmission rounds and transit buffer rounds are described below and also in reference to FIG. 2.

In one embodiment, the node 100A implements congestion control to avoid a loss of information when either of the transit buffers 104A or 104B are full. When either of the transit buffers 104A or 104B are full up to a predetermined threshold, the node 100A disables the permission to transmit additional information. A control bit is set to "DISABLE" in every packet that is transmitted to a neighboring node in the opposite direction until the buffer occupancy reduces below the predetermined threshold. When the occupancy of either the transit buffer 104A or 104B falls below this threshold, the control bit is set back to "ENABLE" so that transmission can resume to the neighboring node. In the case when there are no packets to be sent in the other direction or the transmission of packets is stopped, a control packet is sent to the neighboring node. The node 100A can send control information to its neighboring node even when no data packets are to be transmitted.

The node 100A is also configured to transmit information using the transmitters 108A and 108B. For example, the node 100A may determine if the transit buffer 104A is empty. The transit buffer 104A is capable of holding one or more data packets destined for another node in a distributed system. If the transit buffer 104A is empty, the node 100A uses the transmitter 108A to transmit upstream a data packet stored in the local buffer 106A, as the local buffer 106A is capable of holding one or more data packets that originate from the node 100A. If, however, the transit buffer 104A is not empty, the node 100A uses the transmitter 108A to transmit one or more data packets upstream that are stored in the transit buffer 104A if a transmission condition is satisfied. For example, the transmission condition could test whether (1) a previous data packet transmitted upstream was empty, (2) the previous data packet transmitted upstream had been stored in the local buffer 106A, or (3) a transmission round associated with the previous data packet transmitted upstream matched a transmission round of a data packet stored in the transit buffer 104A. If the first transmission condition is not satisfied, the node 100A can use the transmitter 108A to transmit upstream one or more data packets that are stored in the local buffer 106A.

The node 100A is also configured to use the transmitter 108B to transmit data packets downstream in a similar fashion. As shown in the example in FIG. 1A, the transmitter 108B transmit data in a direction opposite to the transmitter 108A.

Figure 1B:
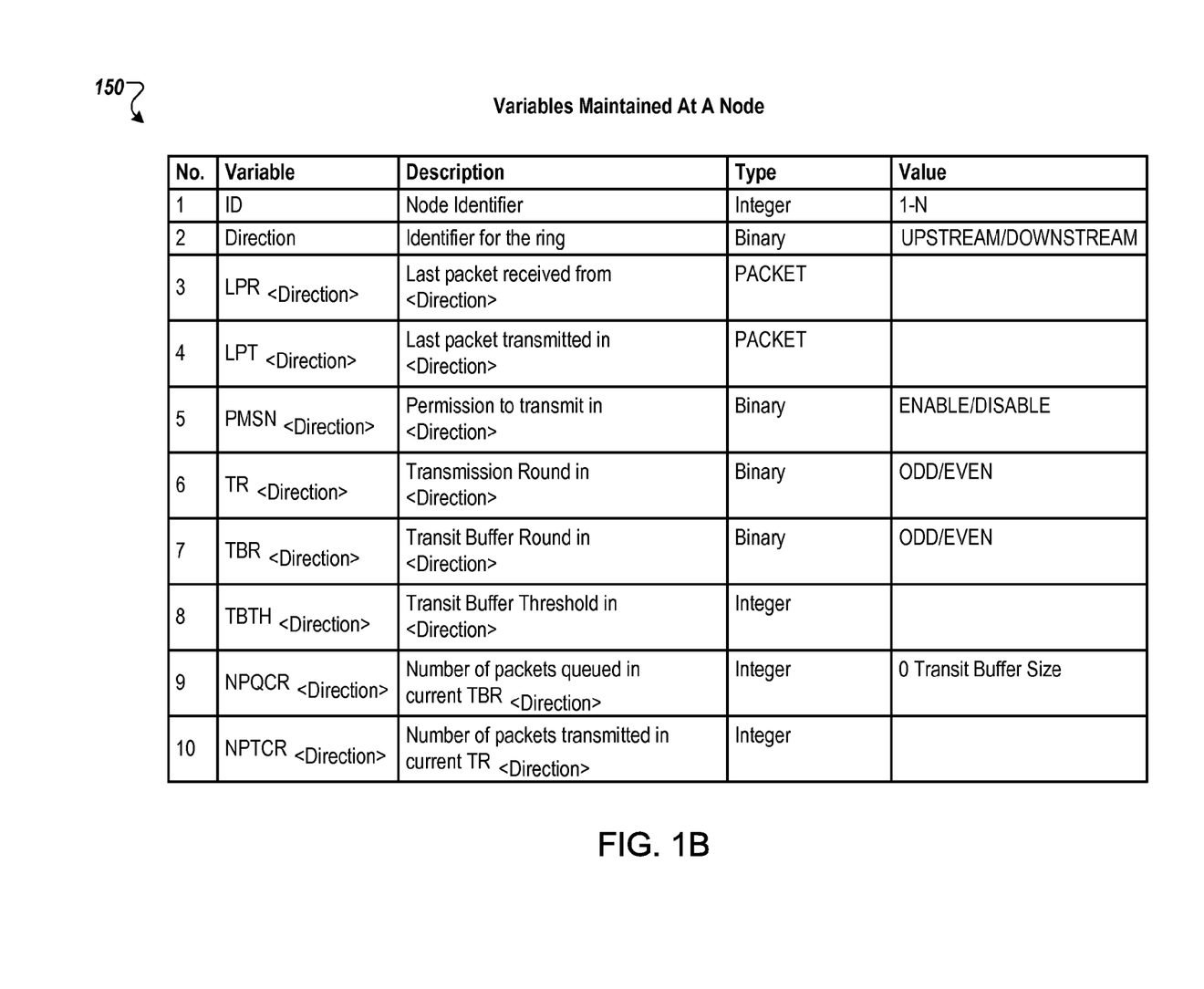
FIG. 1B is a table of variables that maintained at a node, according to one embodiment.

In one embodiment, the nodes in a network, such as the node 10A, maintain a set of node variables, as shown in the table 150 in FIG. 1B. Variables 3 through 10 shown in FIG. 1B are maintained for each direction, namely upstream and downstream. The usage of these variables is discussed in the following paragraphs, along with the protocol description.

Figure 1C:
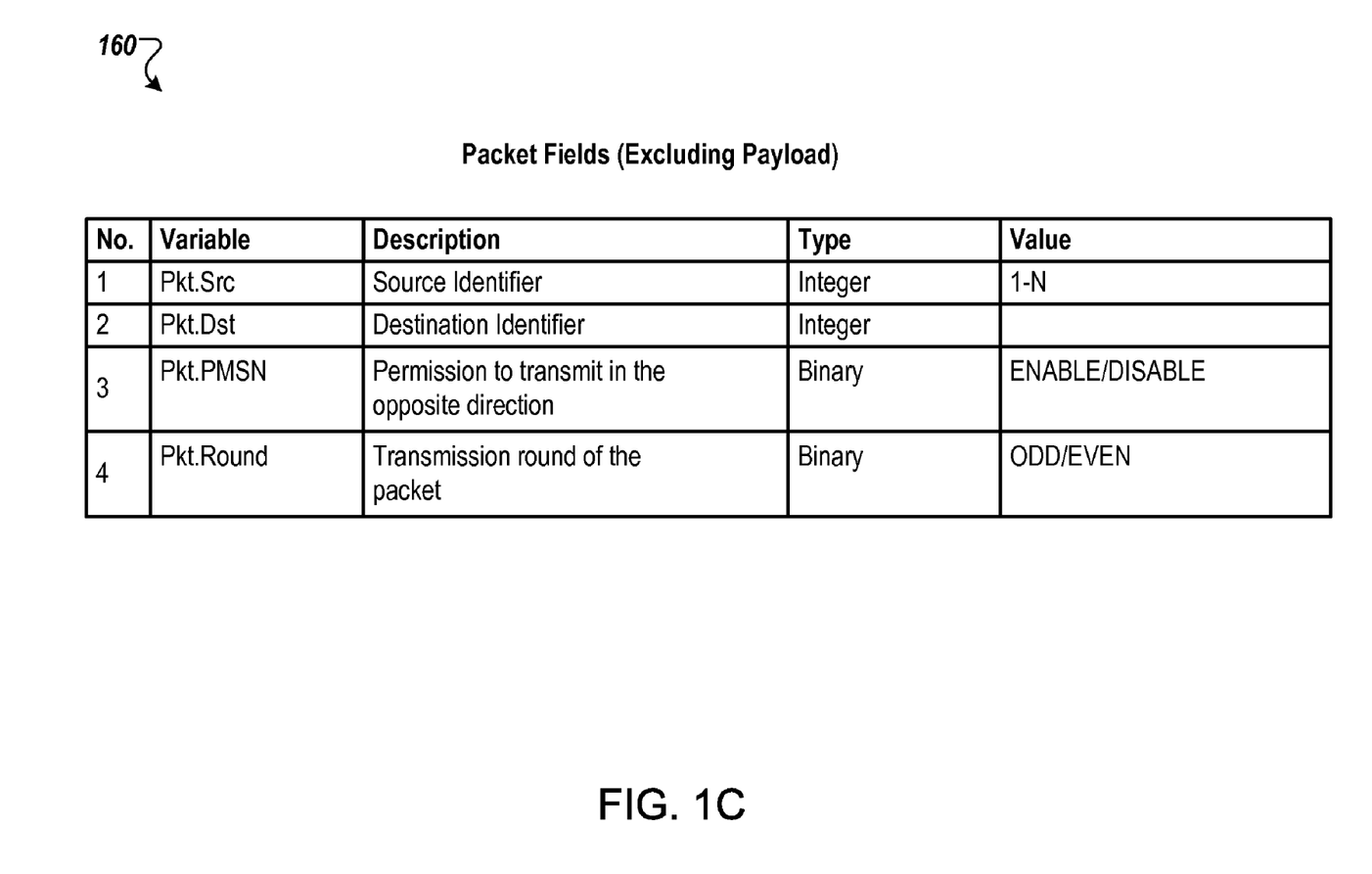
FIG. 1C is a table of packet fields, according to one embodiment.

In one embodiment, each packet processed and/or stored by the node 100A has a fixed length. In this embodiment, the field formats (excluding the payload) for each of these packets are listed in the table 160 shown in FIG. 1C. The "PMSN" and "Round" fields have binary values and therefore require only one bit each.

In further explaining how the node 100A receives and transmits data, it is assumed that, in this example, a network proceeds in discrete time steps at every node in the network, including the node 100A. The duration of a time step is equal to that of the transmission time of a packet with additional guard time. The functions executed by the node 100A during each time steps are shown below in the procedure "Process".

As shown, the node 100A first receives a packet from the input link in a specified direction in the procedure "Receive". The received packet is then processed in the procedure "ProcessPacket". The node 100A then selects a packet to transmit on either direction. The packet can be selected from either the transit or local buffers, which is decided by the procedure "PreparePacket". Hence, in every time step, the node 100A is capable of receiving two packets (i.e., one from each direction) and sending out two packets, one in each direction. The procedures listed within the general "Process" procedure are further described below. The various input and output parameters, when relevant, are also shown.

```
Procedure Process
    1) Packet ← Receive(UPSTREAM)
    2) ProcessPacket(UPSTREAM, Packet)
    3) Packet ← Receive(DOWNSTREAM)
    4) ProcessPacket(DOWNSTREAM, Packet)
    5) Packet ← PreparePacket(UPSTREAM)
    6) Transmit(UPSTREAM, Packet)
    7) Packet ← PreparePacket(DOWNSTREAM)
    8) Transmit(DOWNSTREAM, Packet)
```

In the procedure "Receive", the node 100A receives a packet in the specified direction. This procedure is shown below.

```
Procedure Receive
Input: Direction
Output: Packet
    1) Packet ← Receive packet from the input link of direction
```

The node 100A then processes every packet that it receives. The steps involved in processing a received packet are shown below in the procedure "ProcessPacket".

```
Procedure ProcessPacket
Input: Direction
Output: Packet
    1) If (Direction = UPSTREAM) Then
        a) OppositeDirection ← DOWNSTREAM;
       Else
        a) OppositeDirection ← UPSTREAM;
    2) PMSN_<OppositeDirection> = Packet.PMSN;
    3) If (Packet ≠ EmptyPacket) Then
        a) If (Packet.Round ≠ LPR_<Direction>.Round) Then
            i) ChangeTransitBufferRound(Direction);
        b) If (Packet.DestinationID = ID)
            i) Send Packet to the SAR sublayer;
           Else
            i) QueueInTransitBuffer(Packet, Direction);
        c) LPR_<Direction> ← Packet;
```

A packet received by the node 100 A in a particular direction contains the "PMSN" field that indicates whether the receiving node 100A has permission to transmit in the opposite direction to a neighboring node in the network. As such, the variable "PMSN" maintained by the node 100A for the opposite direction is set to the value indicated in the received packet. The mechanism for setting the "PMSN" field is explained in more detail below.

In one example, it is assumed that the node 100A transmits packets in an output link either in the "ODD" or "EVEN" round. The node 100A transmits packets during these alternating rounds of "EVEN" and "ODD". The transmission round of any given packet is specified in the "Round" field of the packet. When a packet is received by the node 100A, the transmission round of the packet is checked with that of a previous packet that was received in the same direction. If the rounds do not match, then the transit buffer round in that direction is changed. This mapping of transmission rounds to the transit buffer rounds enables the node 100A to operate in an autonomous manner while preserving round boundaries. The steps involved in changing the transit buffer rounds are shown below in the procedure "ChangeTransitBufferRound".

```
Procedure ChangeTransitBufferRound
Input: Direction
    1) If (NPQCR_<Direction> >0) Then
        a) If TBR_<Direction> = ODD Then
            i) TBR_<Direction> = EVEN;
           Else
            i) TBR_<Direction> = ODD;
        b) NPQCR_<Direction> ← 0;
```

The transit buffer round for a given direction is changed when there is at least one packet that is queued in the current round. This ensures that two packets from different transmission rounds (as received from another node in the network) are not queued during the same transit buffer round. The packet is then processed by the node 100A to check the destination address. If the destination address matches the address of the node 100A, the packet is forwarded to the SAR layer 110. Otherwise, it is queued in either the transit buffer 104A or 104B. The steps involved in queueing a packet in the transit buffers 104A or 104B are shown below in the procedure "QueuePacketInTransitBuffer".

```
Procedure QueuePacketInTransitBuffer
Input: Direction, Packet
    1) Packet.Round ← TBR_<Direction>;
    2) Queue(TransitBuffer_<Direction>, Packet);
    3) NPQCR_<Direction> ← NPQCR_<Direction> + 1;
```

When a packet is queued in the transit buffer 104A or 104B, its round is changed to that of the current transit buffer round for the corresponding direction. The last received packet in the direction is updated if a valid packet is received. In one scenario, the node 100A could receive an empty packet if its neighbor does not have permission to transmit in the given direction. In one embodiment, nodes in the network, such as the node 10A, transmit an empty packet to the neighboring node even when they do not have permission to transmit. Such a mechanism allows for fast detection of link failures, hence improving network down time.

Figure 1D:
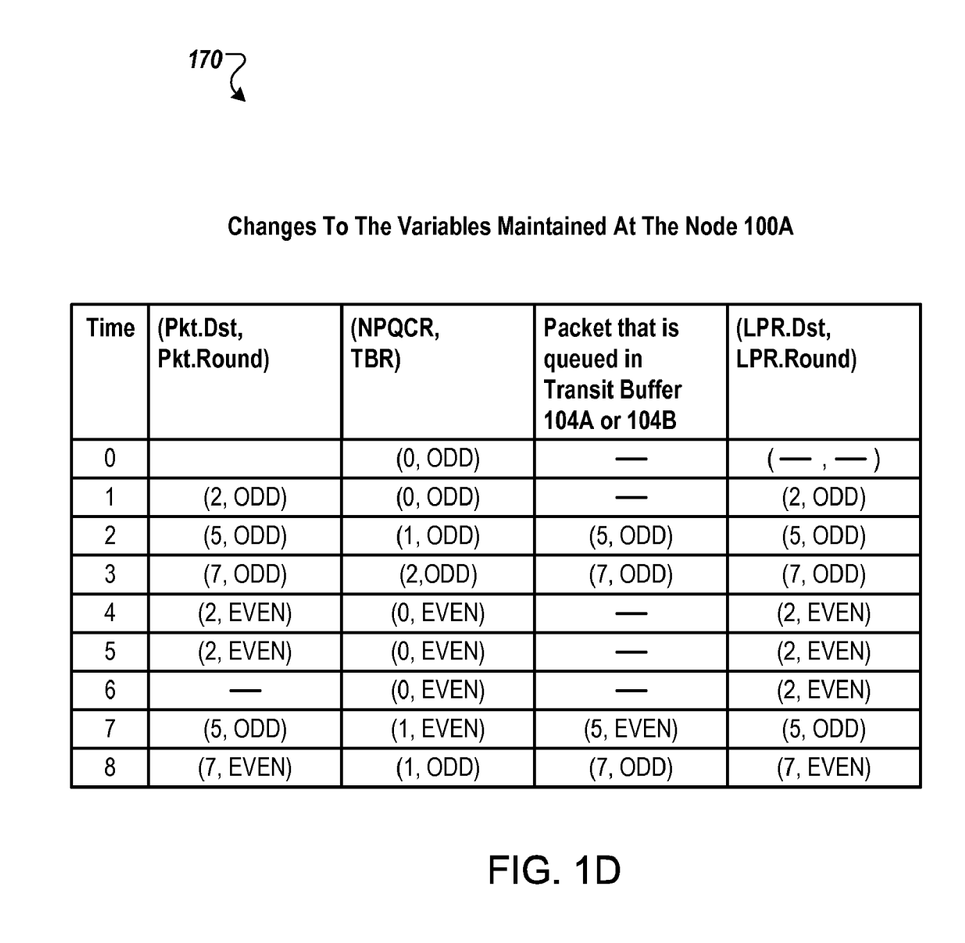
FIG. 1D is a table of an example of changes to the variables maintained at a node, according to one embodiment.

To provide an example, it is assumed that a node in a ring network transmits data to the node 100A. This ring network includes multiple nodes, including "Node 2" (which is the representation for the node 100A in this particular example), "Node 5", and "Node 7". The table 170 in FIG. 1D shows the packet received at the node 100A (i.e., "Node 2") at time t and also the updated values of variables after the packet has been processed. Let "Pkt" denote the packet that is received by the node 100A and is currently being processed.

Assume that at time t=0, the "NPQCR" and "Round" values for the transit buffer 104A or 104B are set to "0" and "ODD", respectively. At time t=1, a packet is received and is treated as a change of round, as there is no valid entry for the last received packet at time t=0. However, the transit buffer round for the corresponding direction is not changed as there are no packets queued in current round. At time t=2 and t=3, packets are received that are not destined for the node 100A, and hence they are queued in the transit buffer 104A or 104B. The "Round" field of the packet queued in the transit buffer 104A or 104B corresponds to the transit buffer round for the given direction, while that of the last received packet corresponds to the actual transmission round of the received packet. At t=4, there is a change in the transmission round, and therefore the transit buffer round for the given direction is also changed. However, packets that were received at t=4 and t=5 are destined for the node 100A and belong to the same round. These packets are forwarded to the SAR sublayer 110. No changes are made to the variables "TBR" and "NPQCR". At t=6, the node 100A does not receive any packet, and therefore the last packet received is not updated. At time t=7, a change in round is observed in the received packet. However, as no packets were queued, the transit buffer round for the given direction remains unchanged. At time t=8, a change in transmission round is observed again and the transit buffer round is changed. The transmission round (from the "Round" field of the last received packet) and the transit buffer rounds match up to time t=6, but they do not match after t=7. The round boundaries, however, are still preserved.

The transmission of packets from the node 100A occurs in cycles. In every cycle, the node 100A transmits a certain number of packets from its transit buffer 104A or 104B, depending on the direction, followed by a packet transmission from the local buffer 106A or 106B. The transmission rounds are classified as "ODD" or "EVEN" rounds, denoted by 1 or 0 in the "Round" field of a packet. The "ODD" and "EVEN" rounds are used alternatively whenever a packet from the local buffer 106A or 106B is transmitted.

As the packets in the transit buffer 104A or 104B are queued based on transit buffer rounds, the node 100A transmits a set of packets from the transit buffer 104A or 104B for every packet transmitted from the local buffer 106A or 106B to achieve a fair share of bandwidth, according to one embodiment. The procedure "PreparePacket" below shows the steps involved in selecting a packet for transmission.

---

Procedure PreparePacket
Input: Direction
Output: Packet
   1) If (Direction = UPSTREAM) Then
       a) OppositeDirection ← DOWNSTREAM;
     Else
       a) OppositeDirection ← UPSTREAM;
   2) If ($PMSN_{<Direction>}$ = ENABLE) Then
       a) If $TransitBuffer_{<Direction>}$ is empty Then
          i) ChangeTransmissionRound(Direction);
          ii) If $LocalBuffer_{<Direction>}$ is empty Then
             A) Packet ← EmptyPacket;
            Else
             A) Packet ← Dequeue ($LocalBuffer_{<Direction>}$);
          Else If (($LPT_{<Direction>}$ = EmptyPacket) or
          $LPT_{<Direction>}$.SourceID = ID) or
          ($LPT_{<Direction>}$.Round = Round of the first packet in
          $TransitBuffer_{<Direction>}$)) Then
            i) Packet ← Dequeue($TransitBuffer_{<Direction>}$);
       Else
          i) ChangeTransmissionRound(Direction);
          ii) If($LocalBuffer_{<Direction>}$ is not empty) Then
             A) Packet ← Dequeue($LocalBuffer_{<Direction>}$);
          Else
             A) Packet ← Dequeue($TransitBuffer_{<Direction>}$);
       b) $LPT_{<Direction>}$ ← Packet
   3) If Length($TransitBuffer_{<OppositeDirection>}$) >= $TBTH_{<OppositeDirection>}$
Then
       a) Packet.PMSN ← DISABLE;
     Else
       a) Packet.PMSN ← ENABLE;

---

A packet is selected from the local buffer 106A or 106B or the transit buffer 104A or 104B only when the node 100A has permission to transmit in the given direction. When the transit buffer 104A or 104B is empty, the node 100A transmits a packet from its local buffer 106A or 106B. When the local buffer 106A or 106B is checked for a packet, a call to the procedure "ChangeTransmissionRound" is invoked, which changes the transmission round on the outgoing link if there was any packet transmitted in the current transmission round. The working of procedure "ChangeTransmissionRound" is similar to that of "ChangeTransitBufferRound". The steps involved in procedure "ChangeTransmissionRound" are shown below.

---

Procedure ChangeTransmissionRound
Input: Direction
   1) If ($NPTCR_{<Direction>}$ > 0) Then
       a) If $TR_{<Direction>}$ = ODD Then
          i) $TR_{<Direction>}$ = EVEN;
       Else
          i) $TR_{<Direction>}$ = ODD;
      b) $NPTCR_{<Direction>}$ ← 0;

---

When a packet is to be selected for transmission, the transit buffer 104A or 104B is checked first. If it is empty, then a packet from the local buffer 106A or 106B is selected for transmission. If the transit buffer 104A or 104B is not empty, then the node 100A decides whether or not to select a packet from the transit buffer 104A or 104B. In one embodiment, a packet from the transit buffer 104A or 104B is selected in one of the following three conditions: (1) The last packet transmitted is empty. In this case, there were no packets to transmit in the previous round, either from the transit buffer 104A or 104B or from the local buffer 106A or 106B; (2) The last packet transmitted was from the local buffer 106A or 106B. In this case, the source address of the packet will be that of the node 100A. Therefore, a round of packets can be transmitted from the transit buffer 104A or 104B; or (3) If neither of the conditions (1) or (2) are satisfied, then the last transmitted packet was from the transit buffer 104A or 104B. In this case, the packet for transmission is selected from the transit buffer 104A or 104B if the round of the last transmitted packet matches the round of the packet to be dequeued from the transit buffer 104A or 104B. (In this instance, the round of the last transmitted packet corresponds to the transit buffer round for the given direction of transmission.) When the packet is selected from the transit buffer 104A or 104B under one of the above three conditions, no updates are made to the transmission round.

If the round of the last transmitted packet does not match the round of the packet to be dequeued from the transit buffer 104A or 104B, then a packet can be selected from the local buffer 106A or 106B. In this case, the procedure "ChanageTransmissionRound" is invoked. If the local buffer 106A or 106B is empty, then a packet from the transit buffer 104A or 104B is selected. Before a packet is transmitted, the round of the packet is changed from the transit buffer round to the current transmission round in the direction of transmission, as shown in the procedure "Transmit" below. It can be observed that two packets belonging to different rounds in the transit buffer will be sent in different transmission rounds.

```
Procedure Transmit
Input: Direction, Packet
    1) Packet.Round ← TR_<Direction>;
    2) Transmit Packet in the output link of Direction;
    3) NPTCR_<Direction> ← NPTCR_<Direction> + 1;
```

If a node, such as the node 100A, is not permitted to transmit in a particular direction, then an empty packet is transmitted, according to one embodiment. Irrespective of which packet is selected for transmission, the permission bit in the packet is set to "ENABLE" if the transit buffer in the opposite direction is below a threshold value. Otherwise, it is set to "DISABLE".

The node 100A has the capability of buffering incoming packets. In order to avoid loss of packets, the node 100A is capable of sending a control, indicated through the "Pkt.PMSN" field in a packet, to its neighbor to stop transmission whenever the transit buffer 104A or 104B is filled to a certain threshold, as specified by "TBTH". The permission bit is set to "DISABLE" in every packet that is transmitted by the node 100A until the buffer occupancy of the transit buffer 104A or 104B reduces below "TBTH" for the given direction. When the occupancy of the transit buffer 104A or 104B falls below "TBTH", the permission bit is set back to "ENABLE" to resume transmission from the neighboring node.

In the case when there are no packets to be sent in a given direction or when the transmission of packets is stopped, the node 100A can still send a control packet to a neighboring node. Because this control packet is destined for the neighboring node, it does not need to be stored in one of the transit buffers of the neighboring node. In this fashion, nodes in a network can exchange control information even when no data packets are to be transmitted. This also allows nodes to monitor the status of the links and neighboring nodes, thus enabling faster failure detection.

Figure 2:
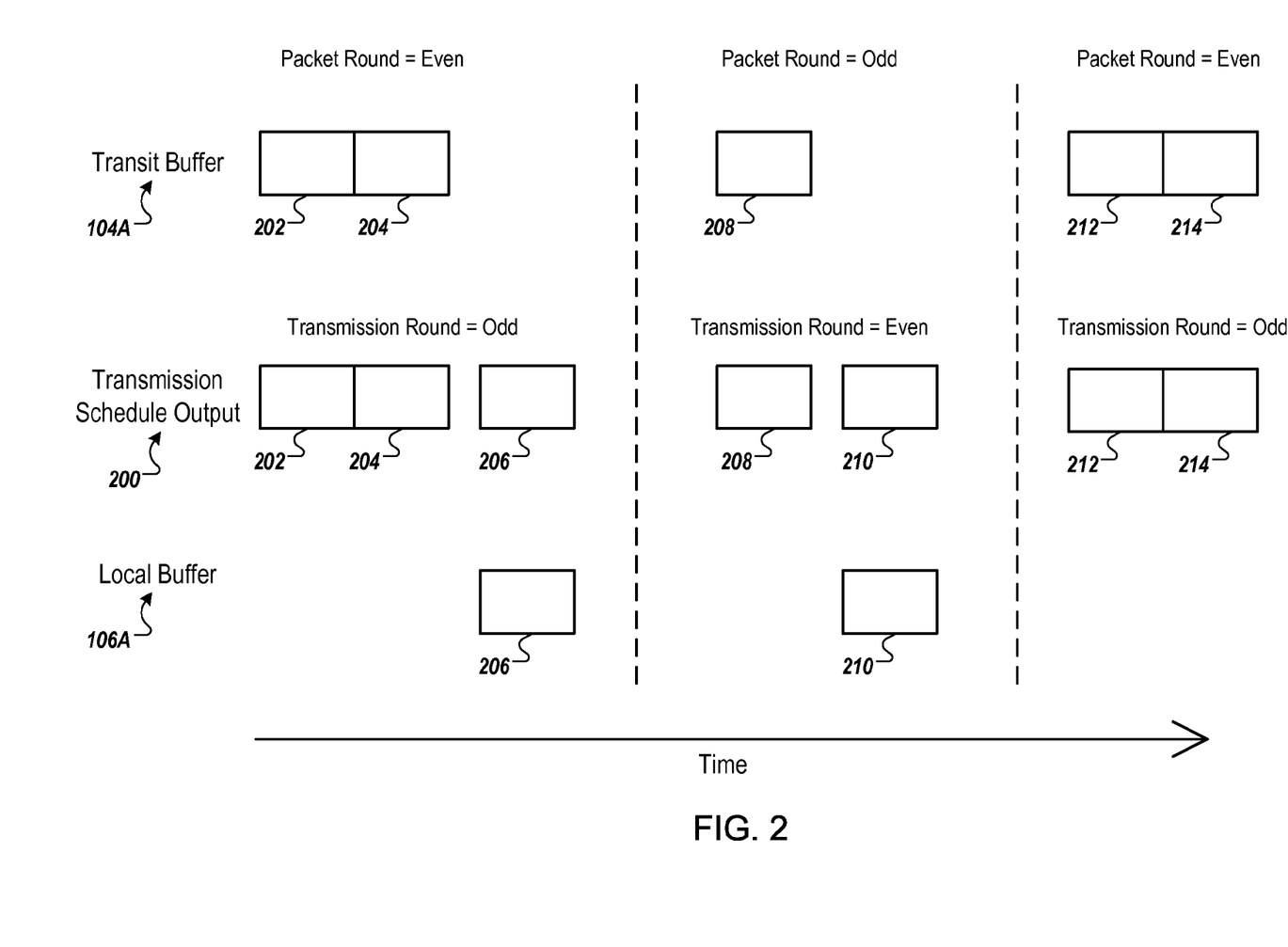
FIG. 2 is a diagram of a schedule for transmitting data, according to one embodiment.

FIG. 2 is a diagram of a schedule for transmitting data, according to one embodiment. In this embodiment, the node 100A shown in FIG. 1A is capable of sending transmission output 200 that includes data from one of its transit buffers 104A and one of its local buffers 106A in a schedule, or series, of transmission rounds over a period of time. FIG. 2 shows an example of data flow on the node 100A in the upstream direction, but another data flow in the downstream direction would function in a similar fashion.

In the example shown in FIG. 2, it is assumed that there are five packets of data sequentially queued, or stored, in the transit buffer 104A and two packets of data sequentially queued, or stored, in the local buffer 106A. The transit buffer 104A contains the data packets 202, 204, 208, 212, and 214. The packets 202 and 204 have a common round of "Even." (The rounds for all of the packets stored in the transit buffer 104A are set by the node 100A according to the setting of the transit buffer round when the packets are stored in the transit buffer 104A.) As such, these packets will be transmitted during the same transmission cycle. The packet 208 has a round of "Odd," and the packets 212 and 214 have a common round of "Even." The local buffer 106A contains the data packets 206 and 210. The transmission schedule output 200 is the output data that is sent by the node 100A to the adjacent node of a network in an upstream direction. During each cycle, the transmission output 200 is capable of including one or more of the packets from the transit buffer 104A and one of the packets from the local buffer 106A.

During a first transmission cycle, it is assumed that the current setting for the transmission round is "Odd." In this transmission round, the node 100A transmits the packets 202 and 204 from the transit buffer 104A in the transmission output 200 since the rounds for each of these packets, as sequentially stored in the transit buffer 104A, is "Even." In addition, the node 100A transmits the packet 206 from the local buffer 106A in this transmission round. During any given transmission round, the settings of the transmission round and the packet rounds need not necessarily match. In certain cases, these rounds may match, but in others, they will not.

During the second cycle, the transmission round for the scheduled transmission output 200 is set to "Even." In this round, the node 100A transmits only the packet 208 from the transit buffer 104A in the transmission output 200, since there are no other packets adjacent to the packet 208 in the transit buffer 104A that also have a packet round of "Odd." The node 100A also transmits the packet 210 from the local buffer 106A in the transmission output 200 during this transmission round.

During the third cycle, the transmission round for the scheduled transmission output 200 is set to "Odd." In this round, the node 100A transmits the packets 212 and 214 from the transit buffer 104A in the transmission output 200. Because there are no longer any remaining packets stored within the local buffer 106A in this transmission round, the transmission output 200 only contains packets from the transit buffer 104A.

In the example shown in FIG. 2, the node 100A is able to include in the transmission output 200 data that has been routed from other nodes in the network and data that originates from the node 100A. The transit buffer 104A contains data packets that have been received by the node 100A but that are destined for other nodes in the network. The local buffer 106A contains data packets that originate directly from the node 100A and that are also destined for other nodes in the network. In each transmission round, the node 100A is capable of selecting one or more packets from the transit buffer 104A and one packet from the local buffer 106A and including these packets in the transmission output 200. In this fashion, the node 100A is able to share its own transmission output from the local buffer 106A with the transmission output sent from other nodes that has been temporarily stored in the transit buffer 104A. In the embodiment shown in FIG. 2, the transmission output 200 includes one packet from the local buffer 106A during each transmission round if the local buffer 106A is not empty. In other embodiments, the transmission output 200 may include more than one packet from the local buffer 106A during each transmission round.

Figure 3:
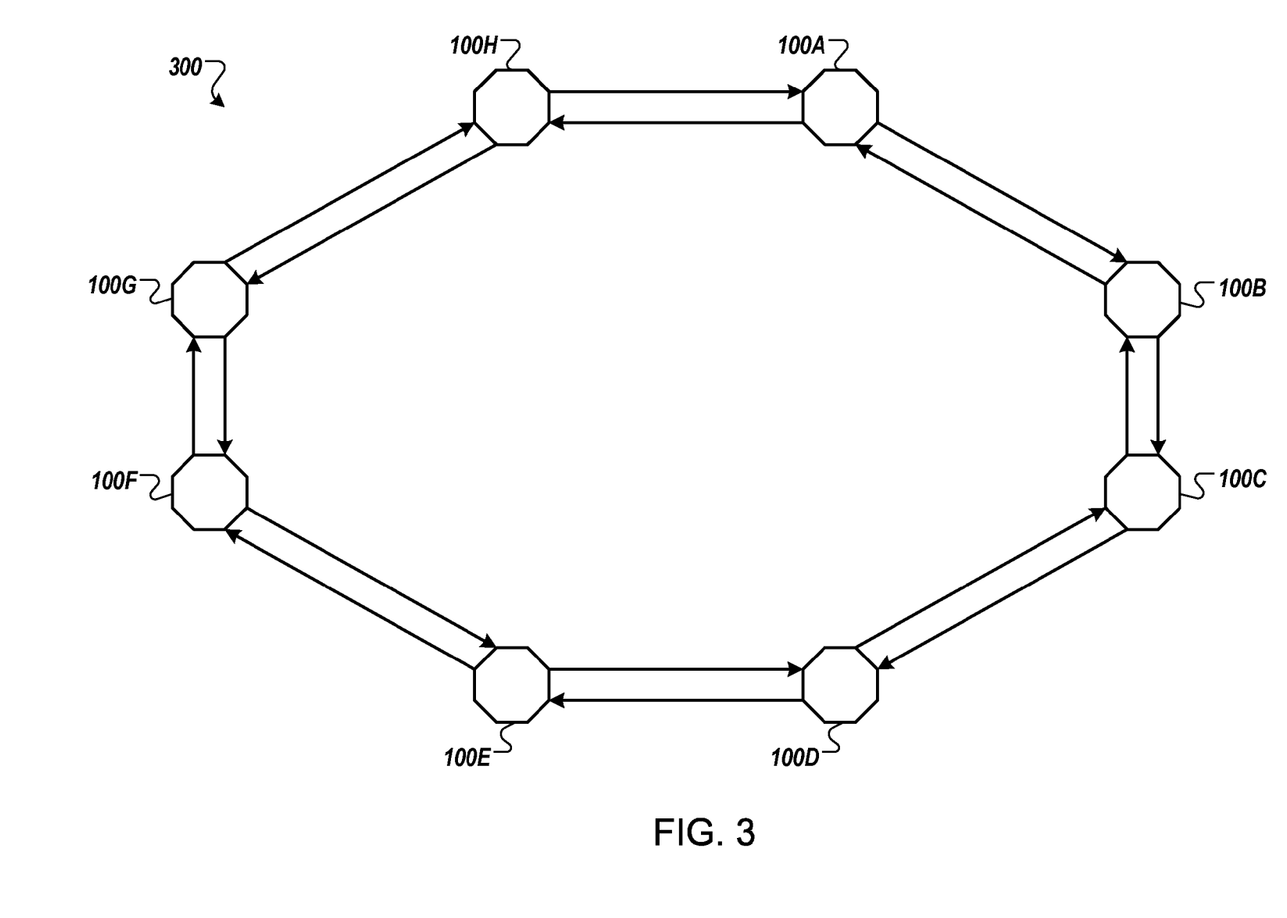
FIG. 3 is a block diagram of a ring network, according to one embodiment.

FIG. 3 is a block diagram of a ring network 300, according to one embodiment. In this embodiment, the node 100A is coupled to a set of other similar network nodes 100B, 100C, 100D, 100E, 100F, 100G, and 100H in the ring network 300. The ring network 300 provides bi-directional data flow, wherein each node can both send and receive data in multiple directions. For example, the node 100A is capable of receiving data from the node 100H during one processing cycle and then sending data to the node 100B during a subsequent processing cycle. The node 100A, however, is also capable of receiving data from the node 100B in the opposite direction during one processing cycle and then sending data to the node 100H during a subsequent processing cycle. In effect, the node 100A is capable to processing data in multiple directions over various processing cycles. Each of the nodes 100A through 100H is able to send originating data to any of the other nodes in the ring network 300 by routing data through intermediary nodes.

In the ring network 300 shown in FIG. 3, each of the nodes 100A through 100H maintains a set of local buffers and a set of transit buffers (such as the local buffers 106A, 106B and the transit buffers 104A, 104B shown in FIG. 1A). Each local buffer for a given node is used for storing data that originates from that given node, and each transit buffer for the given node is used for storing data received by that given node but destined for another node in the ring network 300. The nodes 100A through 100H are then capable of using their local buffers and their transit buffers to process data between these nodes in various different processing cycles, such that each node is capable of receiving data from another node and storing this data in one of its transit buffers during a first processing cycle, and such that each node is capable of transmitting data from this transit buffer and one of the corresponding local buffers to another node during a second processing cycle.

In one embodiment, the nodes 100A through 100H in the ring network 300 may only be configured to receive and send data in a uni-directional fashion. For example, the node 100A may be configured to receive data from the node 100H and to send data to the node 100B, but may not be configured to receive data from the node 100B or to send data to the node 100H. In this embodiment, the nodes 100A through 100H each maintain a single transit buffer and a single local buffer.

Figure 4:
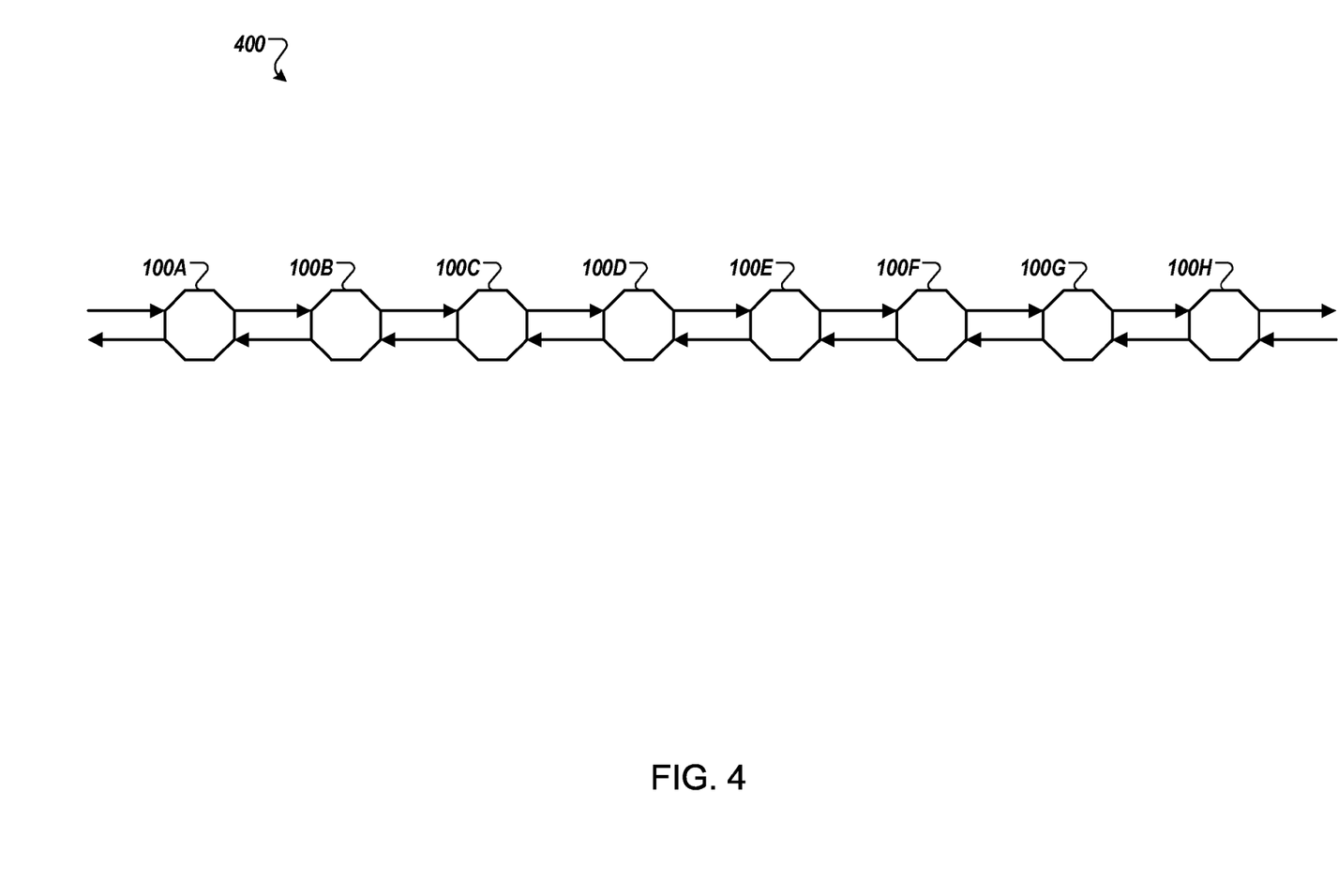
FIG. 4 is a block diagram of a distributed network, according to one embodiment.

FIG. 4 is a block diagram of a distributed network 400, according to one embodiment. In this embodiment, the node 100A is coupled to a set of other similar network nodes 100B, 100C, 100D, 100E, 100F, 100G, and 100H in the distributed network 400 shown in FIG. 4. The distributed network 400 provides bi-directional data flow, wherein each node can both send and receive data in multiple directions. For example, the node 100B is capable of receiving data from the node 100A during one processing cycle and then sending data to the node 100C during a subsequent processing cycle. The node 100B, however, is also capable of receiving data from the node 100C in the opposite direction during one processing cycle and then sending data to the node 100A during a subsequent processing cycle. In effect, the nodes 100A through 100H are capable of processing data in multiple directions over various processing cycles.

In one embodiment, the nodes 100A through 100H in the distributed network 400 may only be configured to receive and send data in a uni-directional fashion. For example, the node 100B may be configured to receive data from the node 100A and to send data to the node 100C, but may not be configured to receive data from the node 100C or to send data to the node 100A. In this embodiment, the nodes 100A through 100H each maintain a single transit buffer and a single local buffer.

Figure 5:
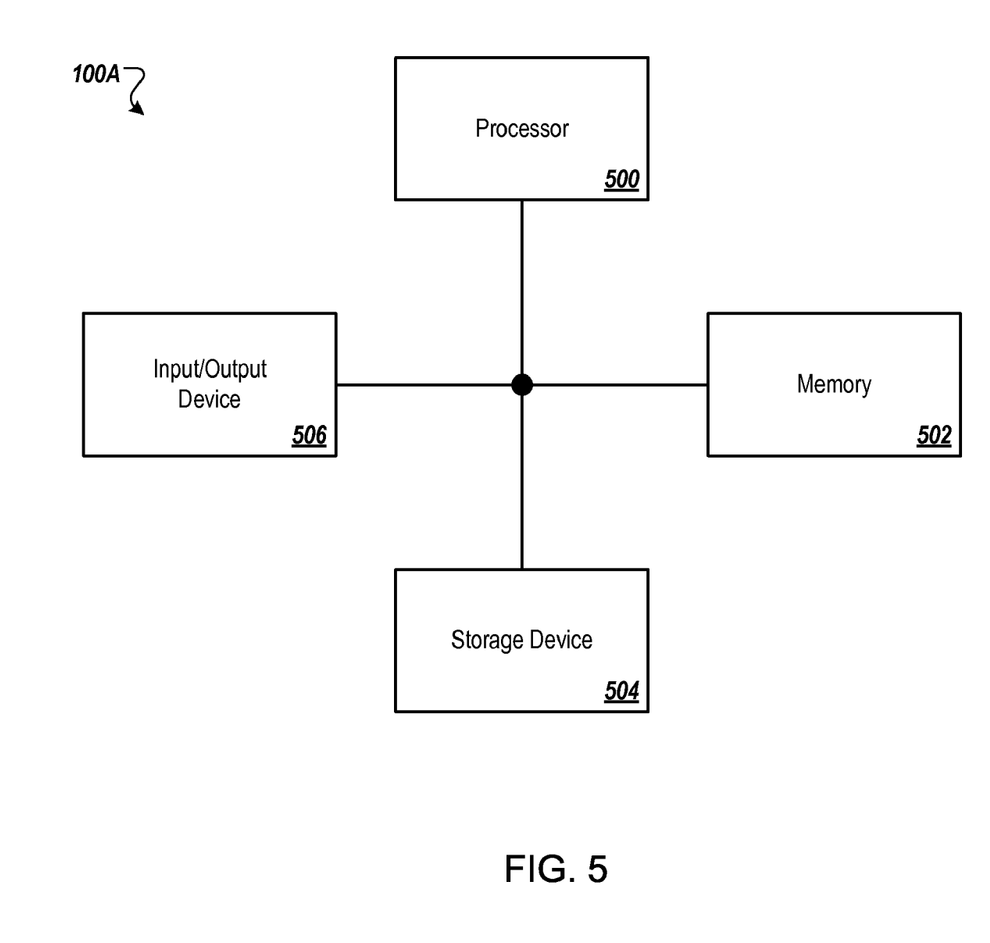
FIG. 5 is a block diagram of one example of a computing system that may be implemented by any one of the nodes shown in FIG. 3 or FIG. 4.

FIG. 5 is a block diagram of one example of a computing system that may be implemented by any one of the nodes shown in FIG. 3 or FIG. 4. As shown in the example in FIG. 5, the computing system of the node 100A includes a processor 500, a memory 502, a storage device 504, and an input/output device 506. Each of the components 500, 502, 504, and 506 are interconnected using a system bus. The processor 500 is capable of processing instructions for execution within the node 100A. In one embodiment, the processor 500 is a single-threaded processor. In another embodiment, the processor 500 is a multi-threaded processor. The processor 500 is capable of processing instructions stored in the memory 502 or on the storage device 504 to display information on the input/output device 506.

The memory 502 stores information within the node 100A. In one embodiment, the memory 502 is a computer-readable medium. In one embodiment, the memory 502 is a volatile memory unit. In another embodiment, the memory 502 is a non-volatile memory unit.

The storage device 504 is capable of providing mass storage for the node 100A. In one embodiment, the storage device 504 is a computer-readable medium. In various different embodiments, the storage device 504 may be a floppy disk device, a hard disk device, an optical disk device, or a tape device.

The input/output device 506 provides input/output operations for the node 100A. In one embodiment, the input/output device 506 includes a keyboard and/or pointing device.

A number of embodiments of the invention have been described. Nevertheless, it will be understood that various modifications may be made without departing from the spirit and scope of the invention. For example, although fixed-size packets are described above, variable-size packets could also be used, wherein fairness in bandwidth access can be achieved in the granularity of a maximum packet size. In addition, the concept of transit buffer rounds can be extended for various output queues at an input link by employing transmission rounds at every output link. A connection-oriented transmission layer employing bandwidth estimation can then be added to improve network throughput. Accordingly, other embodiments are within the scope of the following claims.

What is claimed is:

1. A computer-implemented method for processing data on a specific one node in a network comprising a plurality of nodes configured in a topology in which data, to reach an intended destination node, are transmitted through a configured node-to-node sequence, each of the nodes having a different node identifier that distinguishes the node from other nodes in the network, the method comprising:

receiving data packets at the specific one node, each received data packet being transmitted by a prior node in a first direction through the configured node-to-node sequence and comprising a destination node identifier and a transmission round identifier indicating a transmission round of a prior node in which the data packet was sent;

for each received data packet,
i) if the transmission round identifier for the packet does not match a transmission round identifier for an immediately preceding received data packet, changing a first transit buffer round indicator for a first transit buffer in the specific one node;
ii) if the destination identifier for the data packet does not match the node identifier of the specific one node, storing the data packet in the first transit buffer for later transmission by the specific one node to another node in the first direction, the first data packet being stored with an assigned indicator of the current transit buffer round; and
iii) if the destination identifier of the data packet matches the node identifier, processing the data packet on the specific one node;

storing data packets originating at the specific one node in a first local buffer of the specific one node for later transmission by the specific one node to another node in the first direction; and transmitting data packets from the specific one node in the first direction in successive transmission rounds, wherein in each successive transmission round there is transmitted i) one or more data packets from the first transit buffer that each have the same assigned transit buffer round identifier, if any data packets are present in the first transit buffer, and ii) one or more data packets from the first local buffer, if any data packets are present in the first local buffer.

2. The computer-implemented method of claim 1, wherein the transmission round identifier of the data packet includes checking a round bit in the data packet.

3. The computer-implemented method of claim 1, wherein changing the first transit buffer round identifier includes changing a first transit buffer round that is associated with the first transit buffer if one or more data packets are already stored in the first transit buffer.

4. The computer-implemented method of claim 1, wherein the topology of the network comprises a ring network.

5. The computer-implemented method of claim 1, wherein the method further comprises implementing congestion control when the first transit buffer is full.

6. The computer-implemented method of claim 1, wherein the method further comprises:
  receiving data packets at the specific one node, each received data packet being transmitted by a prior node in a second direction through the configured node-to-node sequence and comprising a destination node identifier and a transmission round identifier indicating a transmission round of a prior node in which the data packet was sent;
  for each data packet received in the second direction,
    i) if the transmission round identifier for the packet does not match a transmission round identifier for an immediately preceding received data packet, changing a second transit buffer round indicator for the specific one node;
    ii) if the destination identifier for the data packet does not match the node identifier of the specific one node, storing the data packet in a second transit buffer for later transmission by the specific one node to another node in the second direction, the first data packet being stored with an assigned indicator of the current transit buffer round for the specific one node; and
    iii) if the destination identifier of the data packet matches the node identifier, processing the data packet on the specific one node
  storing data packets originating at the specific one node and that are to be transmitted in the second direction in a second local buffer for later transmission by the node to another node in the second direction; and
  transmitting data packets from the specific one node in the second direction in successive transmission rounds, wherein in each successive transmission round there is transmitted i) one or more data packets from the second transit buffer that each have the same assigned transit buffer round identifier, if any data packets are present in the second transit buffer, and ii) one or more data packets from the second local buffer, if any data packets are present in the second local buffer.

7. The computer-implemented method of claim 6, wherein the second direction is opposite to the first direction.

8. The computer-implemented method of claim 6, wherein the data packets have a common size.

9. The computer-implemented method of claim 1, wherein processing the data packet on the specific one node includes processing the data packet on the specific one node using a segmentation and reassembly layer.

10. A computer-implemented method for processing data on a specific one node in a network comprising a plurality of nodes configured in a topology in which data, to reach an intended destination node, are transmitted through a configured node-to-node sequence, the method comprising:
  determining if a first transit buffer on the specific one node is empty of received data packets that have not already been transmitted from the specific one node en route to the destination node, wherein the specific one node is configured to store in the first transit buffer all data packets that i) are received from another node of the network, ii) have a destination node that is a node other than the specific one node, and iii) are to be transmitted from the specific one node en route to the destination node in a first direction through the configured node-to-node sequence;
  if the first transit buffer is determined to be empty, transmitting in the first direction a data packet stored in a first local buffer, wherein the specific one node is configured to store in the first local buffer data packets originating from the specific one node that are to be transmitted to another node of the network in the first direction, and
  if the first transit buffer is determined to be not empty, transmitting in the first direction one or more data packets stored in the first transit buffer if a first transmission condition is satisfied, wherein a determination of whether the first transmission condition is satisfied depends on information regarding a most recently transmitted data packet transmitted by the specific one node in the first direction, and transmitting in the first direction a data packet stored in the first local buffer if the first transmission condition is not satisfied.

11. The computer-implemented method of claim 10, wherein transmitting in the first direction a data packet stored in a first local buffer if the first transit buffer is empty includes changing a transmission round associated with the transmitted data packet.

12. The computer-implemented method of claim 11, wherein changing a transmission round associated with the transmitted data packet includes changing a round bit in the transmitted data packet.

13. The computer-implemented method of claim 10, wherein data packets transmitted in the first direction have a common size.

14. The computer-implemented method of claim 10, wherein transmitting in a first direction a data packet stored in a first local buffer if the first transit buffer is empty includes transmitting one or more data packets stored in the first local buffer.

15. The computer-implemented method of claim 10, wherein transmitting in the first direction a data packet stored in the first local buffer if the first transmission condition is not satisfied includes changing a transmission round associated with the transmitted data packet.

16. The computer-implemented method of claim 10, wherein transmitting in the first direction a data packet stored in the first local buffer if the first transmission condition is not satisfied includes transmitting in the first direction a data packet stored in the first local buffer if the first local buffer contains one or more data packets.

17. The computer-implemented method of claim 10, wherein transmitting in the first direction one or more data packets stored in the first transit buffer if a first transmission condition is satisfied includes transmitting in the first direction one or more data packets stored in the first transit buffer if
  a previous data packet transmitted in the first direction was empty, or
  the previous data packet transmitted in first direction had been stored in the first local buffer, or a transmission round associated with the previous data packet transmitted in first direction matches a transmission round of a first data packet stored in the first transit buffer.

18. The computer-implemented method of claim 10, wherein the topology of the network comprises a ring network.

19. The computer-implemented method of claim 10, wherein the method further comprises:
  determining if a second transit buffer on the specific one node is empty of received data packets that have not already been transmitted from the specific one node en route to the destination node, wherein the specific one node is configured to store in the second transit buffer all data packets that i) are received from another node of the network, ii) have a destination node that is a node other than the specific one node, and iii) are to be transmitted from the specific one node en route to the destination node in a second direction through the configured node-to-node sequence;
  if the second transit buffer is determined to be empty, transmitting in the second direction a data packet stored in a second local buffer, wherein the specific one node is configured to store in the second local buffer data packets originating from the specific one node that are to be transmitted to another node of the network in the second direction, and
  if the second transit buffer is determined to be not empty, transmitting in the second direction one or more data packets stored in the second transit buffer if a second transmission condition is satisfied, wherein a determination of whether the second transmission condition is satisfied depends on information regarding a most recently transmitted data packet transmitted by the specific one node in the second direction, and transmitting in the second direction a data packet stored in the first local buffer if the second transmission condition is not satisfied.

20. The computer-implemented method of claim 19, wherein the second direction is opposite to the first direction.

21. A computer-readable medium having computer-executable instructions contained therein for performing a method, the method comprising:
  receiving data packets at the specific one node, each received data packet being transmitted by a prior node in a first direction through the configured node-to-node sequence and comprising a destination node identifier and a transmission round identifier indicating a transmission round of a prior node in which the data packet was sent;
  for each received data packet,
    i) if the transmission round identifier for the packet does not match a transmission round identifier for an immediately preceding received data packet, changing a first transit buffer round indicator for a first transit buffer in the specific one node
    ii) if the destination identifier for the data packet does not match the node identifier of the specific one node, storing the data packet in the first transit buffer for later transmission by the specific one node to another node in the first direction, the first data packet being stored with a transit buffer round indicator that equals the current first transit buffer round indicator for the first transit buffer; and
    iii) if the destination identifier of the data packet matches the node identifier, processing the data packet on the specific one node;
  storing data packets originating at the specific one node in a first local buffer of the specific one node for later transmission by the specific one node to another node in the first direction; and
  transmitting data packets from the specific one node in the first direction in successive transmission rounds, wherein in each successive transmission round there is transmitted i) one or more data packets from the first transit buffer that each have the same assigned transit buffer round identifier, if any data packets are present in the first transit buffer, and ii) one or more data packets from the first local buffer, if any data packets are present in the first local buffer.

22. A computer-readable medium having computer-executable instructions contained therein for performing a method, the method comprising:
  determining if a first transit buffer on the specific one node is empty of received data packets that have not already been transmitted from the specific one node en route to the destination node, wherein the specific one node is configured to store in the first transit buffer all data packets that i) are received from another node of the network, ii) have a destination node that is a node other than the specific one node, and iii) are to be transmitted from the specific one node en route to the destination node in a first direction through the configured node-to-node sequence;
  if the first transit buffer is determined to be empty, transmitting in the first direction a data packet stored in a first local buffer, wherein the specific one node is configured to store in the first local buffer data packets originating from the specific one node that are to be transmitted to another node of the network in the first direction, and
  if the first transit buffer is determined to be not empty, transmitting in the first direction one or more data packets stored in the first transit buffer if a first transmission condition is satisfied, wherein a determination of whether the first transmission condition is satisfied depends on information regarding a most recently transmitted data packet transmitted by the specific one node in the first direction, and transmitting in the first direction a data packet stored in the first local buffer if the first transmission condition is not satisfied.

23. The computer-implemented method of claim 10, wherein the first transmission condition is that each of the one or more data packets that is transmitted has the same transit buffer round identifier associated with the data packet.

24. The computer-implemented method of claim 23, wherein each data packet received at the specific one node from another node is checked to determine if a transmission round identifier that identifies a transmission round of an immediately preceding node in which the data packet was transmitted has changed from a transmission round identifier of an immediately preceding data packet received from the immediately preceding node, and if there is a change, changing a current transit buffer round indicator for the specific one node.

25. The computer-implemented method of claim 24, wherein the method further comprises, for each received data packet that is stored in the transit buffer of the specific one node, storing the received data packet in association with an identifier for the current transit buffer round of the specific one node.

* * * * *

UNITED STATES PATENT AND TRADEMARK OFFICE
CERTIFICATE OF CORRECTION

PATENT NO.         : 7,536,477 B2
APPLICATION NO. : 10/784568
DATED              : May 19, 2009
INVENTOR(S)      : Srinivasan Ramasubramanian and Arun K. Somani

It is certified that error appears in the above-identified patent and that said Letters Patent is hereby corrected as shown below:

Column 13, line 43 (Claim 6), please delete "node" and insert --node;-- therefor;

Column 15, line 56 (Claim 21), please delete "node" and insert --node;-- therefor.

Signed and Sealed this

Eighteenth Day of August, 2009

David J. Kappos
*Director of the United States Patent and Trademark Office*